United States Patent [19]

Latsch et al.

[11] 4,223,644
[45] Sep. 23, 1980

[54] METHOD AND APPARATUS FOR CONTROLLING OPERATIONAL VARIABLES OF AN INTERNAL COMBUSTION ENGINE

[75] Inventors: Reinhard Latsch, Vaihingen; Peter J. Schmidt, Schwieberdingen; Josef Wahl, Stuttgart, all of Fed. Rep. of Germany

[73] Assignee: Robert Bosch GmbH, Stuttgart, Fed. Rep. of Germany

[21] Appl. No.: 960,271

[22] Filed: Nov. 13, 1978

[30] Foreign Application Priority Data

Nov. 11, 1977 [DE] Fed. Rep. of Germany ....... 2750470

[51] Int. Cl.³ ............................ F02B 3/00; F02M 7/00
[52] U.S. Cl. .................................... 123/489; 123/487; 123/440; 60/285; 60/276
[58] Field of Search ........ 123/32 EE, 32 EA, 32 EB, 123/32 EC, 119 ED, 119 EC; 60/276, 285

[56] References Cited

U.S. PATENT DOCUMENTS

| | | | |
|---|---|---|---|
| 3,898,962 | 8/1975 | Honig et al. | 123/32 EB |
| 3,964,443 | 6/1976 | Hartford | 123/32 EB |
| 4,057,042 | 11/1977 | Aono | 123/32 EE |
| 4,107,717 | 8/1978 | Klötzner et al. | 123/32 EA |
| 4,130,095 | 12/1978 | Bowler et al. | 60/285 |

Primary Examiner—P. S. Lall
Attorney, Agent, or Firm—Edwin E. Greigg

[57] ABSTRACT

A principal operational variable of an internal combustion engine, for example the fuel-air mixture ratio, is controlled by superposition of three separate control steps. The basic setting of a control variable is obtained with a relatively coarse forward control, for example a carburetor in the case of fuel-air mixture control. Superimposed on this basic control is a refined forward control step which is based on the prevailing magnitudes of at least one operational variable, preferably the engine speed and the throttle valve position, and which applies a multiplicative correction to the basic setting of the fuel-air mixture. The third superimposed control step is a feedback control of the fuel-air mixture within the range of correction applied by the second control steps but based on still another engine variable, in particular the exhaust gas composition as sensed by an oxygen sensor ($\lambda$-sensor). After comparison with the reference signal, the $\lambda$-sensor signal is multiplied with the sum of the values of the basic air factor setting and the first corrective air factor setting. The data required for applying the first correction are preferably stored in a digital memory.

16 Claims, 4 Drawing Figures

METHOD AND APPARATUS FOR CONTROLLING OPERATIONAL VARIABLES OF AN INTERNAL COMBUSTION ENGINE

FIELD OF THE INVENTION

The invention relates to a method and an apparatus for controlling the operation of a motor vehicle powered by an internal combustion engine. In particular, the invention relates to a method and an apparatus for providing very precise regulation of, for example, the fuel-air mixture, the ignition angle, the exhaust gas recycle rate, and the like. According to the invention, the basic function of the engine, i.e., the value of the variable being controlled, is set coarsely by a simple forward control process, for example the carburetor in case of fuel-air mixture control. Superimposed thereon are first and second corrections on the basis of the instantaneous magnitude of control variables, for example speed, throttle opening and exhaust gas composition.

BACKGROUND OF THE INVENTION

The invention describes a method and an apparatus for controlling the behavior of a generalized machine, in particular an internal combustion engine. It is the nature of the present invention to be applicable to a very wide class of regulatory processes, not confined merely to the control of the fuel-air mixture in an internal combustion engine. In particular, any operational variable of an engine or a vehicle, for example the ignition angle and the exhaust gas recycle rate, would be subject to control by the present invention.

The invention is based on a correction for the precise adaptation of one or more engine variables to prevailing engine conditions. For this purpose, sensors are provided that indicate prevailing states, for example the exhaust gas composition and on the basis of which the basic settings of other variables, for example the fuel-air mixture, are adjusted. The basic data and the corrective data are stored in suitable memories which, when interrogated, can provide an output signal that corrects the basic setting of the control variable. The corrective process is then guided by a closed-loop control which applies a continuous supervision of the behavior of the controlled variable in accordance with the prescribed values in the memory. In the closed-loop control process, the signal which is representative of the actual value of the controlled variable may be compared with a nominal value and the difference may be applied multiplicatively to the output of a controller that engages the corrective system.

In a particularly practical example of the invention, the variable which is monitored to generate the actual control value may be the exhaust gas composition as sensed by a so-called λ-sensor but, in other cases, the sensor which generates the actual value of the control variable may be an engine detonation sensor, various extreme value and optimizing systems, a sensor for measuring the engine roughness, and the like. In general, the invention consists of sensing the magnitude of operational parameters, and to use this magnitude to address a memory which contains a characteristic data field. The memory generates an output variable which is applied to, for example, mechanical control elements that additionally correct the basic control variable, for example the fuel-air mixture. The output signal of the memory is then further influenced, for example multiplicatively, after comparison of the actual value of an engine variable with a set-point value to provide an overall, highly precise yet relatively simple and inexpensive control of the engine.

In a particular examplary but non-limiting example to be further described in detail below, the basic setting of the fuel mixture composition is provided by a carburetor which contains a corrective control element for providing adjustments to the fuel or air quantity which is being supplied. The monitored engine variable may be, for example, the exhaust gas composition as sensed by a λ-sensor or some other suitable sensor.

In order to prevent dynamically incorrect adaptations, the integrated value of the control deviation is multiplied with the total value of the air factor λ which is also stored in the above-mentioned memory and is finally applied to the final control element that sets the correction in the carburetor.

In the apparatus associated with the exemplary embodiment of the invention, using a carburetor for a basic control, a comparator which receives the λ-sensor signal feeds an up-down counter whose output is fed to a multiplying circuit which multiplies this value with the total value of the air factor, i.e., the value $\lambda_0 + \Delta\lambda$. The result is then applied via a digital-to-analog converter to the final control element. The use of a digital characteristic field to be used in association with the coarse basic control by a carburetor is known, for example, from the German Offenlegungsschrift No. 2 607 232. In that known system, the carburetor is so adjusted as to supply to the engine an amount of fuel which, in a first approximation, is proportional to the aspirated air current, thereby providing a basic but somewhat coarse adaptation. The precise adaptation of the carburetor is provided by the use of an electrically engaged control element which permits a regulation of the air pressure in an air chamber contained within the float chamber of the carburetor so as to change the flow of fuel through the main jet of the carburetor into the induction tube. The control process employs a read-only memory which, when addressed on the basis of one or more external operational variables of the engine, delivers an output signal which provides the corrected adaptation of the carburetor. The present invention is an improvement and further development of the known process of a digital control process and some of the basic elements of the known apparatus are contained in the illustration of FIG. 3 to be further described below.

In commonly used carburetors, the adaptation of the mixture composition for various operational domains of the engine cannot be made very precisely. Particular difficulties arise when the engine is being used in marginal domains and under extreme conditions, for example in an extreme lean-burn configuration where a relatively large variation of the air factor λ becomes necessary. In the known system, the carburetor is equipped with at least one control element which is subjected to a superimposed control process based on a characteristic data field and which corrects the basic setting of the carburetor so as to follow the relatively complicated dependencies of the air factor. The control element is engaged preferably on the basis of two variables, for example for the throttle plate angle α and the engine speed n, or again the induction tube pressure p and the engine speed n, or even on the basis of the air flow rate Q in conjunction with the engine speed n. The magnitudes of these variables are detected by sensors and, after being suitably converted, are used for addressing a memory to retrieve the data stored therein. Basically, the memory will provide an output datum for any operational state of the engine. However, if the electronic corrective control fails, the basic setting of the carburetor is sufficiently accurate to permit at least a temporary operation of the engine.

OBJECT AND SUMMARY OF THE INVENTION

It is thus a principal object of the present invention to provide a method and an apparatus for controlling an internal combustion engine by providing a basic setting of a principal operational variable, for example the fuel-air mixture, by further providing a superimposed corrective control of the principal variable on the basis of sensed engine conditions and by permitting a quantitative adaptation of this correction to prevailing ambient conditions, changes in engine operation, and the like. In particular, it is an object of the present invention to provide for additional corrections such as engine warm-up, altitude corrections, and the like, electrically. Yet another object of the invention is to retain an emergency operational ability even if the electronic system fails. It is an associated object of the present invention to prevent dynamic misadaptations of the corrective control in transition regions by providing a data storage memory containing two characteristic data fields. When applied to a carburetor-controlled engine, one of the data fields contains the total value of the air factor $\lambda$ plus the corrective amount $\Delta\lambda$ whereas the other data field contains only the correction to the air factor $\Delta\lambda$.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

The process and apparatus according to the invention for fine correction of a basically set control process will now be described with respect to a specific but non-limiting example of the correction in the mixture control supplied by a carburetor for an internal combustion engine.

Figure 1:
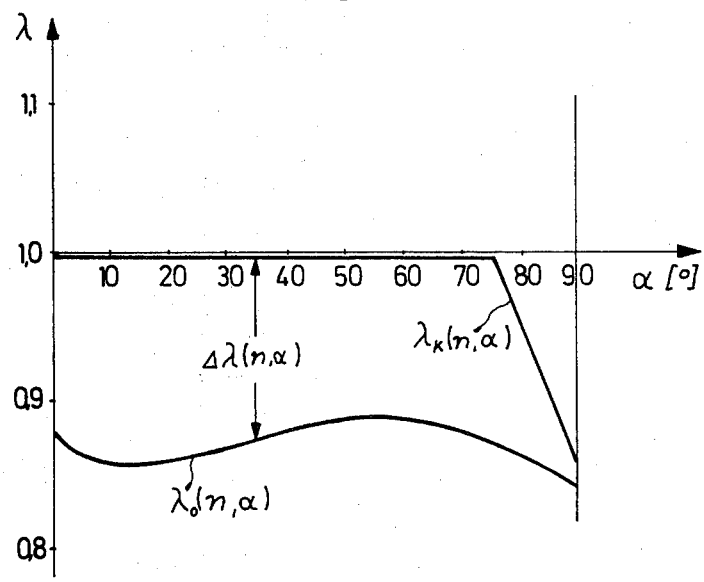
FIG. 1 is a diagram illustrating the variation of the air factor $\lambda$ as a function of throttle angle in a basic setting.
Figure 2:
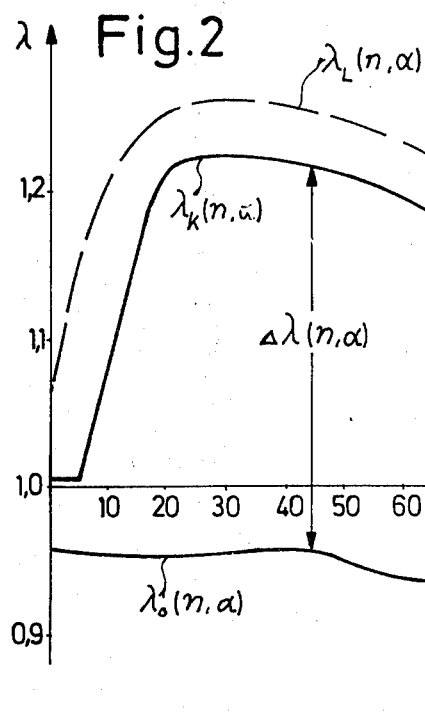
FIG. 2 is a diagram illustrating the variation of the air factor $\lambda$ as a function of throttle angle in a lean-burn setting.

The basic purposes of the invention are elucidated in the diagrams of FIGS. 1 and 2. These diagrams represent portions of characteristic data fields in which the air factor $\lambda$, defined to be proportional to the ratio of the air supplied to the engine to the fuel used by the engine, is shown as a function of the throttle opening angle $\alpha$. In each case, the curve labeled $\lambda_0$ is representative of the basic setting supplied by the carburetor while the curve labeled $\lambda_K$ represents the desired precise adaptation. The vertical distance between these two curves defines the difference $\Delta\lambda$ which must be provided by means of the final control element associated with the carburetor. FIG. 1 illustrates a portion of a characteristic data field in which the air factor $\lambda$ remains equal to 1.0 throughout the major part of the operational domain and varies in the direction of a rich mixture ($\lambda<1$) only in the full-load domain. It is obvious however, that the value $\lambda$ is different for every throttle plate angle $\alpha$. The complete characteristic data field defined by $\Delta\lambda = f(\alpha, n, p, Q \ldots)$ may be represented especially well in digital manner and may be stored very suitably in, for example, a read-only memory (ROM).

FIG. 2 is a diagram illustrating the aforementioned variables in a characteristic data field providing lean-burn conditions. In this case, the desired air factor $\lambda_K$ lies everywhere close to the lean-burn limit $\lambda_L$ (lean misfire limit) and goes to enriched values only for rather large throttle plate angles. In both instances, the correction required as expressed by the value $\Delta\lambda$ is seen to be considerable.

Figure 3:
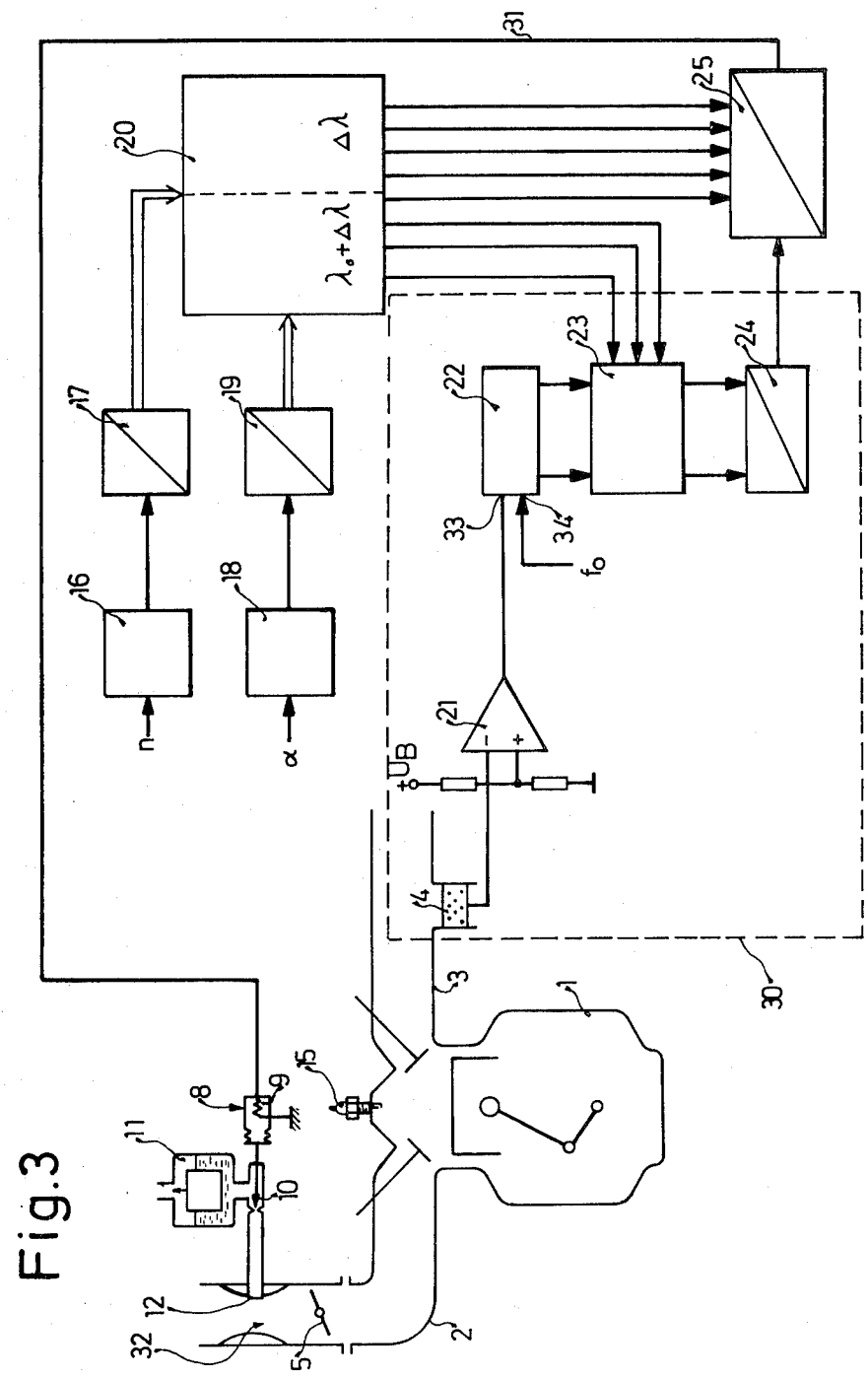
FIG. 3 is a block circuit diagram of an exemplary embodiment of the invention applied to a carburetor-controlled engine.

An apparatus associated with an internal combustion engine whose basic fuel mixture control element is a carburetor is shown in simplified schematic form in FIG. 3. The characteristic data fields are stored in a ROM 20. At the input side of the apparatus, there is provided a transducer 16 for generating a signal related to engine speed n and a throttle plate position transducer 18 which generates a signal related to the throttle plate angle $\alpha$. Each of these transducers is preferably a frequency generator which provides a periodic output signal whose frequency is proportional to the associated input variable n or $\alpha$. The detailed construction of such transducers, for example variable oscillators, is known and will not be discussed in further detail. Similarly, the detailed construction of other elements of the circuit of FIG. 3 which are known to the person skilled in the art will not be described in great detail.

The output signals from the transducers 16 and 18 are applied, respectively, to frequency-to-digital converters 17, 19, i.e., counters, which receive the input signal and generate therefrom a binary number. These binary numbers present at the output of the counters 17, 19 change continuously as a function of the input variables n, $\alpha$ and serve to address the memory 20. When so addressed, the memory 20 delivers an output datum which is used to engage a final control element as will be described in detail below.

The construction of the ROM 20 is not critical, in particular it may be a relatively small memory which may be used in association with an interpolation process so as to conserve space.

The illustration of FIG. 3 shows a region 30 bordered by a dashed line which represents the feedback system. For the purpose of the present discussion, let it be initially assumed that the feedback system 30 is not operative. In this case, the data delivered by the memory 20 are fed to a subsequent digital-to-analog converter 25 where they are converted into some analog signal, for example a voltage, a current or a time signal, which is applied via a line 31 to the final control element 8. The construction of the final control element 8 is also arbitrary and may be adapted to any particular situation. In the exemplary embodiment shown, the mixture control of the engine is provided by a carburetor with a float chamber 11 and a main jet 12 which terminates in the venturi 32 of the induction tube 2 of the engine just ahead of the throttle valve 5. The corrective control element 8 engages a needle valve 10 by means of an electromagnetic coil 9. The needle valve 10 controls the flow of fuel from the float chamber 11 to the venturi 32. The elements so far described represent a direct, forward control system. This system may be augmented by providing an exhaust gas sensor 4 in the exhaust channel 3 which generates an output signal that contains information regarding the fuel-air mixture actually provided to the engine. This system may be used to perform a closed-loop control which superimposes a precise quantitative adaptation of the engine operation according to prevailing external conditions, changes in engine configuration, and the like. The superimposed closed-loop control is also performed by means of the final control element 8 by engaging, for example, the digital-to-analog converter 25.

The $\lambda$ sensor 4 in the exhaust pipe generates an actual value signal which is applied to one input of a threshold switch 21 acting as a comparator. Another input of the comparator 21 receives a set-point signal which, as will be appreciated by the person skilled in the art, may be suitably varied to account for changing engine temperature or exhaust gas temperature and other factors. The output signal from the threshold switch 21 is applied to the up/down control input 33 of an integrating up/down counter 22. A pulse train of a constant frequency $f_0$ is supplied to a counting input 34 of the counter so that the output of the counter will represent a number associated with the sensor signal. The output signal of the counter 22 is used as the first input signal for a subsequent multiplying circuit 23.

It has been pointed out above that the corrective forward control based on the data stored in the ROM is used only to correct the fuel-air mixture in the region $\Delta\lambda$, on the basis of external parameters, for example engine speed and throttle plate angle $\alpha$.

Similarly, the closed-loop multiplicative control based on the $\lambda$ sensor signal also affects only the $\Delta\lambda$ region and has no effect on the basic carburetor setting. For this reason, the adaptation of the system to the correct, i.e., desired, air factor is subject to errors in transition regions. Such errors can be prevented, according to the invention, by storing within the ROM 20 a secondary characteristic data field which stores the summation of $\lambda_0+\Delta\lambda$. It is this sum value of $\lambda_0+\Delta\lambda$ which is applied to a secondary input of the multiplying circuit 23 where it is multiplied with the number obtained from the output of the counter 22. The product at the output of the multiplier 23 is then fed to a digital-to-analog converter 24 where it is transformed into a voltage or frequency or some other analog signal which is then used to engage the digital-to-analog converter 25 that ultimately actuates the final control element 8.

Thus it is the number p delivered by the up/down counter 22 which is multiplied with the summation of $\lambda_0+\Delta\lambda$, thereby providing a multiplicative closed-loop control. When the throttle plate angle changes abruptly from a value $\alpha_1$ to a value $\alpha_2$ the product constituting the output of the multiplying circuit 23 will change from a value $$h_1 = p \cdot (\lambda_{01} + \Delta\lambda_1)$$

to a value $$h_2 = p \cdot (\lambda_{02} + \Delta\lambda_2)$$

For a short time, the value p at the output of the integrating counter 22 may be assumed to be constant. Thus, $$h_2 = (\lambda_{02} + \Delta\lambda_2) \cdot h_1 / (\lambda_{01} + \Delta\lambda_1)$$

Figure 4:
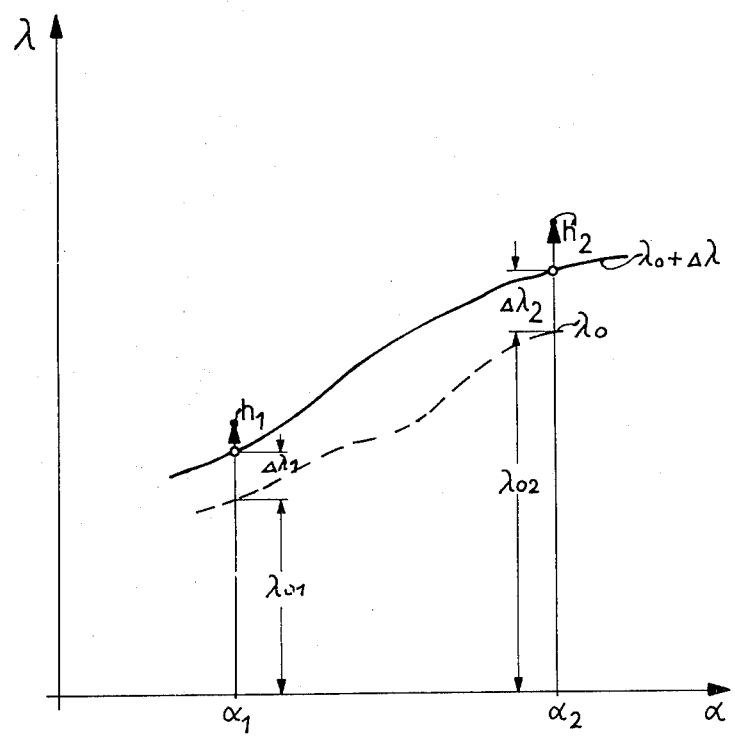
FIG. 4 is a diagram illustrating the effects of the multiplicative regulation on the air factor $\lambda$ as a function of throttle angle $\alpha$.

These conditions are represented in the diagram of FIG. 4.

The two characteristic data fields may be stored especially advantageously within the ROM 20 if, in for example an 8-bit memory, the first part of the memory (3-bits) is used to store the $\lambda_0+\Delta\lambda$ field, whereas the second part of the memory (5-bits) is used to store the $\Delta\lambda$ values. Inasmuch as the final control element only sets the $\Delta\lambda$ values, a somewhat coarser quantization is possible and only the two data fields represented here must be stored.

It should be noted that the method and apparatus described above, i.e., the overall system of the invention, may also be used for controlling a fully electronic ignition timing or, for example, the continuous control of the exhaust gas recycle rate on the basis of characteristic data. Other applications are also possible.

It will also be noted that the signals required by the apparatus of the invention, i.e., the $\lambda$-sensor signal, the engine speed and throttle plate signals, etc., are normally already available in the engine for other control processes and may therefore be used without additional expenditure.

Applications of the foregoing description to other systems of internal combustion engines or generalized control situations, including the aforementioned possibilities, are intended to be fully within the spirit and scope of the invention.

What is claimed and desired to be secured by Letters Patent of the United States is:

1. A method for controlling the magnitude of a first variable quantity associated with the operation of an internal combustion engine, comprising the steps of:
    defining the magnitude of said first variable quantity in a first rough approximation ($\lambda O$);
    data storage means containing data representing a second approximation correcting value;
    correcting the magnitude of said first variable quantity in a second approximation, more accurate than said first approximation, on the basis of the magnitude of at least one variable engine operation parameter received by said data storage means containing data ($\Delta\lambda$) being a difference between said first approximation and said second approximation;
    providing a closed loop feedback signal based on a third variable quantity associated with the operation of said engine; and
    correcting on a third approximation only said second approximation correcting value by said closed loop feedback signal, said feedback signal being multiplied with other data derived from said data storage means upon receipt of said at least one variable engine operation parameter.

2. A method according to claim 1, wherein said third variable quantity is the exhaust gas composition of the engine sensed by means of a $\lambda$ sensor.

3. A method according to claim 1, wherein said third variable quantity is the engine roughness (speed irregularity) sensed by means of a sensor for generating a signal related to engine roughness.

4. A method according to claim 1 wherein said first variable quantity is the fuel-air mixture ratio provided to the engine, and including basic control means comprising a carburetor, said carburetor being provided with a final control element for performing said correcting steps of the magnitudes of said fuel-air mixture ratio, and wherein said third variable quantity is the exhaust gas composition of the engine sensed by means of an exhaust gas λ-sensor.

5. A method according to claim 4, wherein said carburetor performs said defining of the magnitude of the fuel mixture ratio according to a basic approximation ($\lambda_0$) as a function of the throttle plate angle of opening $\alpha$ and wherein said first correcting step is carried out by applying a first correction to the value of the air factor λ equal to a magnitude $\Delta\lambda$, said feedback signal being provided by comparator means for applying a second correction only to said final control element applying a correction in the amount of $\Delta\lambda$, and wherein said data storage means stores the prevailing values of the quantity $\Delta\lambda$ and the prevailing values of the sum of $\lambda_0 + \Delta\lambda$ and wherein the sum value $\lambda_0 + \Delta\lambda$ is multiplied with the output of said comparator means for application to said final control element.

6. A method according to claim 1 wherein said data storage means includes fixed-value memory data containing the sum of said first approximation as well as said first approximation correction value ($\Delta\lambda$) including the step of multiplying said fixed-value memory data with said feedback signal.

7. An apparatus for controlling the magnitude of a first variable quantity associated with the operation of an internal combustion engine, comprising:
  basic control means for defining the magnitude of said first variable quantity in a first approximation;
  first correction means for applying a first correction to the magnitude of said first variable quantity on the basis of the magnitude of at least one other, second variable quantity, said first correction means including sensor means for sensing the magnitude of said at least one other, second variable quantity, data storage means for storing the same, final control means for engaging said basic control means to thereby effect said first correction; and
  feedback control means for applying a second correction to the magnitude of said first variable quantity on the basis of the magnitude of at least one still other, third variable quantity, including sensor means for sensing the magnitude of said third variable quantity, comparator means for comparing the sensed magnitude of said third variable quantity with a reference value, and multiplier means for multiplying the signal from said comparator means with the output from said data storage means to thereby effect said second correction.

8. An apparatus according to claim 7, wherein said third variable quantity is the exhaust gas composition of the engine and said sensor means for sensing the magnitude of said third variable quantity is an oxygen sensor (λ-sensor).

9. An apparatus according to claim 7, wherein said third variable quantity is the occurrence of engine knocking (detonation) and said sensor for sensing the magnitude of said third variable quantity is an engine knock sensor.

10. An apparatus according to claim 7, wherein the third variable quantity is the engine roughness (engine speed fluctuation) and wherein said sensor for sensing the magnitude of said third variable quantity is an engine roughness detector.

11. An apparatus according to claim 7, wherein said first variable quantity is the fuel mixture ratio for the internal combustion engine, and said basic control means is a carburetor having an associated final control element for performing said first and second corrections, wherein said data storage means includes a storage area for storing the difference ($\Delta\lambda$) between the basic value ($\lambda_0$) of the air factor λ and the desired value ($\lambda_K$) and said data storage means further includes a second storage area for storing the sum of the values $\lambda_0 + \Delta\lambda$, said comparator means being a threshold switch the output of which is fed to one input of said multiplier means.

12. An apparatus according to claim 11, further comprising a transducer and a further transducer for sensing the value of said at least one other second variable quantity and for transforming it into a digital datum.

13. An apparatus according to claim 11, wherein said comparator means is a threshold switch and said apparatus further comprises an integrating up/down counter whose input is connected to the output of said comparator and whose output is related to said second correction and is applied to an input of said multiplier circuit, another input of said multiplier circuit receiving the sum $\lambda_0 + \Delta\lambda$ from said data storage means.

14. An apparatus according to claim 13, further comprising a digital-to-analog converter for receiving the output from said multiplier means and transforming the same into an analog signal applied to a multiplying input of a second digital-to-analog converter which also receives the output of said data storage means.

15. An apparatus according to claim 14, wherein said second digital-to-analog converter directly controls said final control means and receives at one of its inputs the output of said multiplier circuit and at the other one of its inputs an output from said data storage means related to the value $\Delta\lambda$.

16. An apparatus according to claim 14, wherein said final control means includes an electromagnetic switching means and a needle valve actuated by said switching means for engaging a conduit between a nozzle and a float chamber of said carburetor.

* * * * *